United States Patent
Okamura et al.

(10) Patent No.: US 9,340,241 B2
(45) Date of Patent: May 17, 2016

(54) VEHICLE RIGIDITY CONTROL DEVICE

(71) Applicant: Fuji Jukogyo Kabushiki Kaisha, Tokyo (JP)

(72) Inventors: Junya Okamura, Tokyo (JP); Manabu Hashimoto, Tokyo (JP); Hiroshi Matsuda, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 296 days.

(21) Appl. No.: 14/029,264

(22) Filed: Sep. 17, 2013

(65) Prior Publication Data
US 2014/0095019 A1    Apr. 3, 2014

(30) Foreign Application Priority Data
Sep. 28, 2012    (JP) .................. 2012-218528

(51) Int. Cl.
*B62D 21/15*    (2006.01)
*B62D 37/00*    (2006.01)

(52) U.S. Cl.
CPC ............. *B62D 37/00* (2013.01); *B62D 21/15* (2013.01)

(58) Field of Classification Search
None
See application file for complete search history.

(56) References Cited

U.S. PATENT DOCUMENTS

| | | | |
|---|---|---|---|
| 2004/0212226 A1* | 10/2004 | Bethge | B60N 2/42736 297/216.1 |
| 2005/0125155 A1* | 6/2005 | Kudo | B62D 15/0265 701/301 |
| 2006/0065466 A1* | 3/2006 | Nishikaji | B60R 21/01548 180/268 |
| 2009/0322123 A1* | 12/2009 | Tanaka | B60R 19/02 296/203.02 |
| 2015/0021936 A1* | 1/2015 | Nusier | B62D 21/152 293/114 |

FOREIGN PATENT DOCUMENTS

JP    2005-262951 A    9/2005

* cited by examiner

*Primary Examiner* — Jerrah Edwards
*Assistant Examiner* — Paul Castro
(74) *Attorney, Agent, or Firm* — Smith, Gambrell & Russell, LLP

(57) ABSTRACT

A vehicle includes: a wire that is mounted on a vehicle body to which an external force is applied according to a running state during running of the vehicle, and applies a tension to the vehicle body; an actuator to adjust the tension of the wire to change a rigidity of the vehicle body; and a controller to output a control signal to the actuator. The controller determines the running state, outputs to the actuator a control signal designating a tension according to the determined running state, and controls distortion of the vehicle body.

16 Claims, 7 Drawing Sheets

VEHICLE RIGIDITY CONTROL DEVICE

CROSS-REFERENCE TO RELATED APPLICATIONS

The present application claims priority from Japanese Patent Application No. 2012-218528 filed on Sep. 28, 2012, the entire contents of which are hereby incorporated by reference.

BACKGROUND

1. Technical Field

The present invention relates to vehicles such as an automobile.

2. Related Art

Known structures of the body of a vehicle such as an automobile include a monocoque structure in which outer plates are welded to a plurality of assembled frame members, and a chassis structure in which frame members are mounted on a chassis base. Safety against collision and favorable running performance are required for the vehicle body, and thus it is generally desired that the vehicle body has high rigidity.

However, multiple performances required for the vehicle body, for example, safety against collision and favorable running performance are not necessarily satisfied at the same time. For example, a front side member, which projects forward from the vehicle compartment and serves as a frame member, supports the engine. In order to achieve favorable running performance, when the vehicle is cornering, the front side member should have high rigidity capable of supporting the engine against the cornering force so as to keep the position of the engine. On the other hand, in order to achieve collision safety performance, the front side member should maintain a relatively high rigidity but absorb a strong impact of a collision by buckling of the front side member. In general, the collision safety performance is given higher priority than the running performance. The running performance is sacrificed for the collision safety performance. For example, the thickness of a sheet metal which is used for a front side member is limited for the sake of the collision safety performance. The length of a front side member is determined according to the size of a vehicle body. Insufficient thickness of the sheet metal of a front side member may cause the front side member to be bent or distorted due to the weight of the engine when the vehicle is cornering. The distortion of the vehicle body affects running performance such as operational responsiveness and steering stability. Such limitation on the rigidity of a vehicle body is applied to not only the front side member. The rigidity of members included in the vehicle body may be limited in order to achieve e.g., the collision safety performance. As a result, for example, as described in Japanese Unexamined Patent Application Publication No. 2005-262951, the vehicle body may be distorted during running of the vehicle even if the vehicle body adopts a structure in which the frame members of the vehicle body are reinforced with a rigid element such as a sheet metal.

As described above, it is desirable to achieve high running performance demanded of the vehicle body, for example, high operational responsiveness and steering stability demanded of sport utility vehicles.

SUMMARY OF THE INVENTION

In the present invention, in order to achieve high running performance, a wire is mounted to the vehicle body and a tension of the wire according to a running state is applied to the vehicle body.

An aspect of the present invention provides a vehicle including: a wire that is mounted on a vehicle body to which an external force is applied according to the running state of a vehicle during running thereof, and applies a tension to the vehicle body; an actuator that adjusts the tension of the wire to change the rigidity of the vehicle body; and a controller that outputs a control signal to the actuator for adjusting the tension of the wire. The controller determines the running state, and outputs to the actuator a control signal designating a tension according to the determined running state to control distortion of the vehicle body. The controller may obtain at least one of a behavior of the vehicle body, an operation input to the vehicle body, and forecast information of a travelling route, and to determine the running state based on the obtained information.

The controller may obtain an operation state of vehicle dynamics control or damper control information of a magnetic ride suspension as behavior information of the vehicle body, to obtain information on an opening degree of an accelerator, an braking operation, or a steering angle as information of an operation input to the vehicle body, or to obtain a captured image outside the vehicle, navigation information, or traffic information as forecast information of the travelling route.

The controller may repeatedly determine any one of an acceleration state, a deceleration state, a stop state, a turn state, and a speed range as the running state during running of the vehicle, and to update the control signal and change the tension of the wire when it is determined the running state has changed.

The vehicle may further include a detector to detect the tension of the wire. The actuator may adjust the tension of the wire detected by the detector, so that it matches a target tension designated by the control signal of the controller.

The controller may determine the acceleration state, the deceleration state, the stop state, the turn state, or the speed range based on the operation state of vehicle dynamics control, the damper control information of the magnetic ride suspension, the information of the opening degree of the accelerator, the brake operation information, or the steering angle information, determine a state of a travelling road based on a captured image outside the vehicle, navigation information, or traffic information, and to determine a different running state according to the state of the travelling road.

The controller may predict the presence of a collision based on the obtained information, and to control the tension of the wire to be released or at a maximum when a collision is predicted.

A movable pulley may be attached to the wire, and the actuator applies a tension to the wire by moving the movable pulley in a direction in which the movable pulley is pressed against the wire.

DETAILED DESCRIPTION

Hereinafter, examples of the present invention will be described with reference to the accompanying drawings.

First Example

Figure 1:
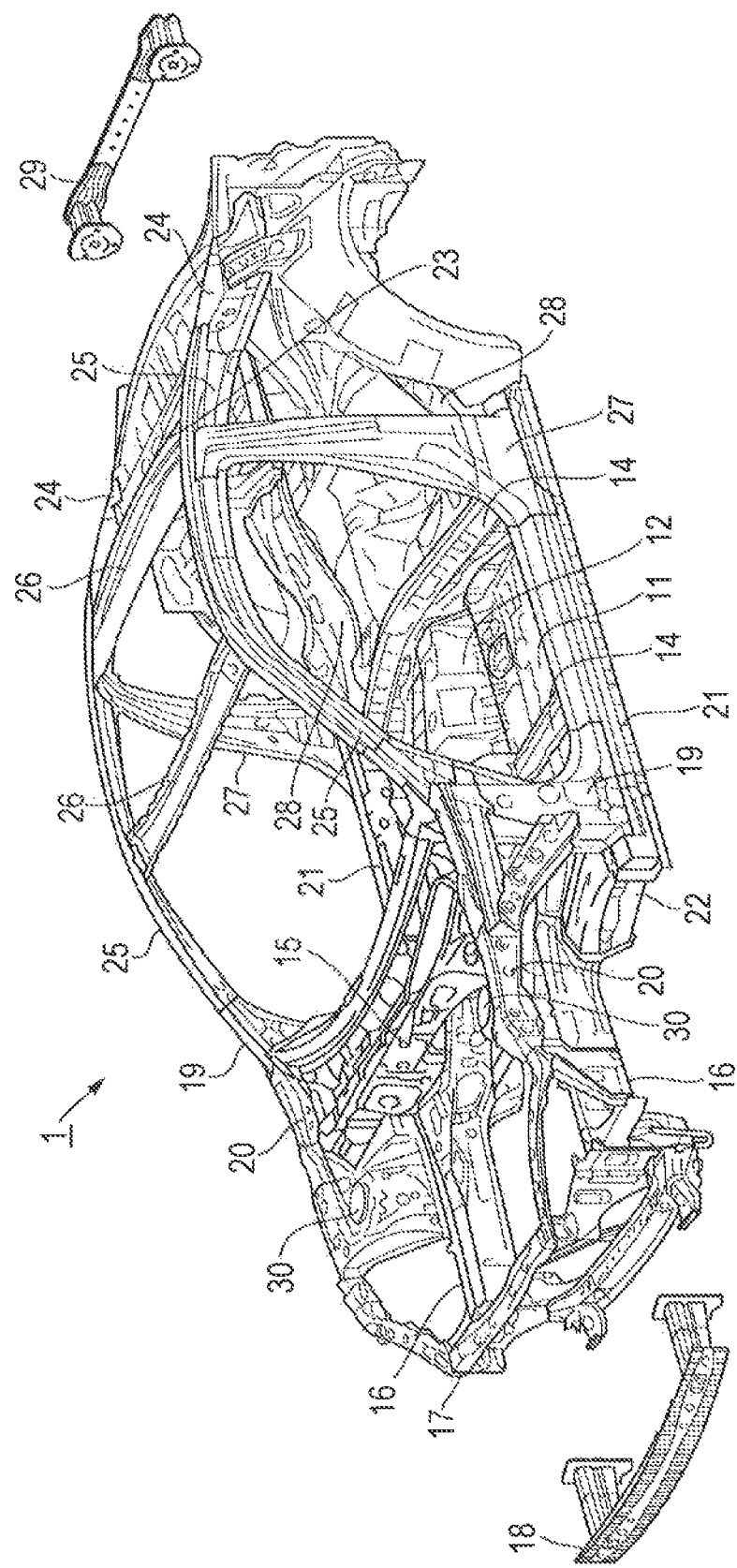
FIG. 1 is a perspective view of the body of an automobile according to a first example of the present invention, the view taken diagonally from above.
Figure 2:
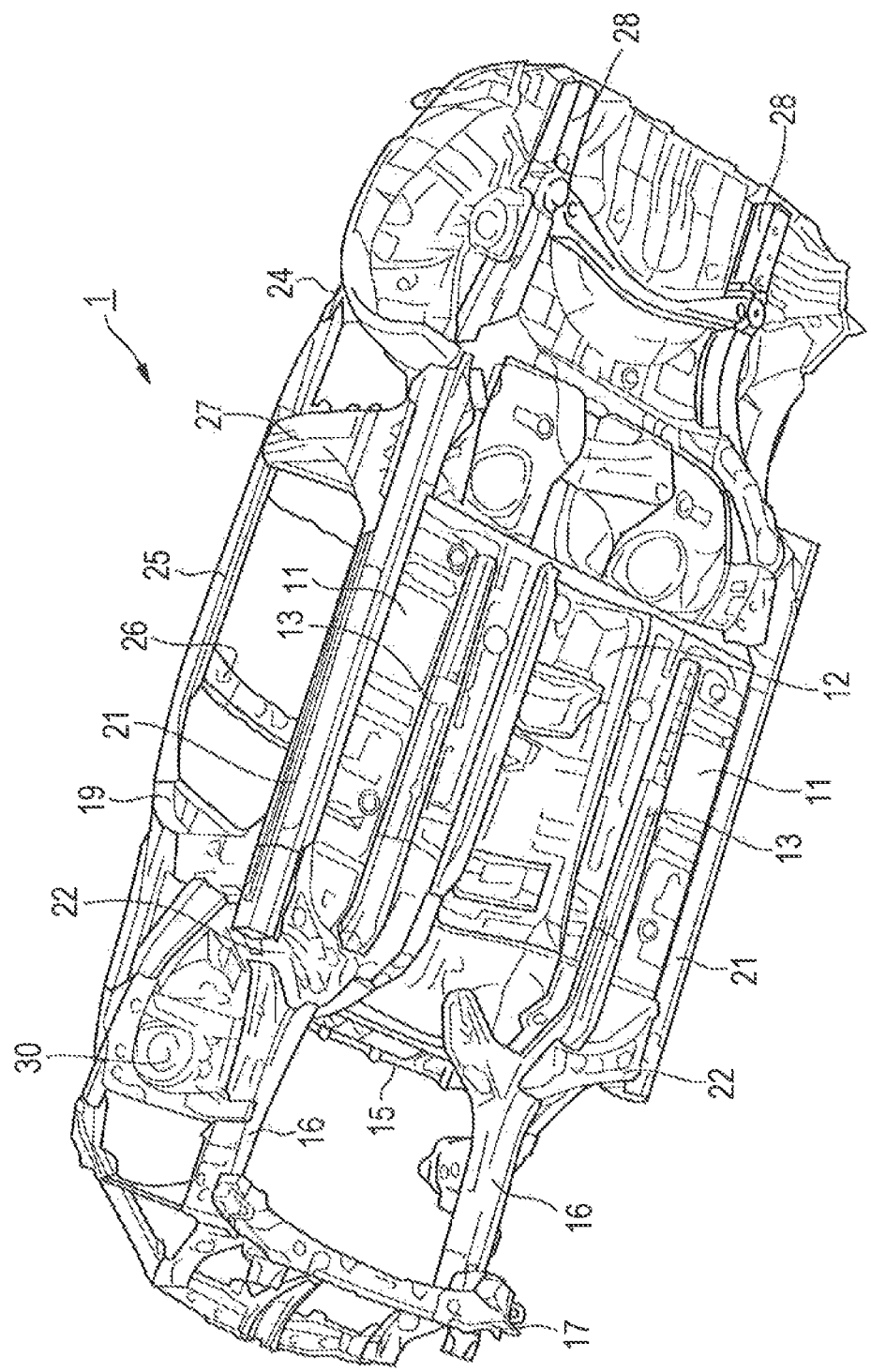
FIG. 2 is a perspective of the vehicle body of FIG. 1, the view taken diagonally from below.

FIGS. 1 and 2 are each a perspective view of a vehicle body 1 of an automobile according to a first example of the present invention. FIG. 1 is a top perspective view of vehicle body 1. FIG. 2 is a bottom perspective view of the vehicle body 1. The vehicle body 1 in this example has a monocoque structure in which multiple frame members are combined and steel plates are welded to the assembled frame members.

Frame members of the vehicle body 1 in the monocoque structure of FIGS. 1 and 2 will be specifically described. A pair of floor members 13 extending in the front-rear direction is provided between the both right and left edges of a floor panel 11 and a center tunnel 12 under a floor panel 11 of the vehicle compartment of the vehicle body 1. A floor cross member 14 crossing the both right and left edges of the floor panel 11 is provided over the floor panel 11. The floor members 13 and the floor cross member 14 are connected via the floor panel 11. A dashboard 15 is vertically provided on the front edge of the floor panel 11. The dashboard 15 serves as a partition between the vehicle compartment and the engine chamber. A pair of front side members 16 are mounted on the front of the dashboard 15, the pair of front side members 16 projecting forward. A radiator panel 17 and a front bumper beam 18 are mounted on the end of the pair of front side members 16. The rear end of the pair of front side members 16 are connected with the front end of the floor members 13. A pair of A pillars 19 is mounted on the both right and left edges of the dashboard 15. A pair of front upper members 20 is provided on the pair of A pillars 19, the pair of front upper members 20 projecting forward from the pair of A pillars 19. Front doors (not illustrated) are mounted on respective A pillars 19 in an openable and closable manner. A front door beam and a front door cross member are provided in each of the front doors. A pair of side sills 21 are provided on the both right and left edges of the floor panel 11. The front end of each of the pair of side sills 21 are connected with corresponding one of the pair of front side members 16 or the pair of floor members 13 via a steel plate 22 in a torque box structure. The pair of side sills 21 are connected by the floor cross member 14. A rear bulk head 23 is vertically provided on the rear edge of the floor panel 11, the rear bulk head 23 serving as a partition between the vehicle compartment and the luggage compartment. A pair of C pillars 24 is mounted on the both right and left edges of the rear bulk head 23. A pair of roof side rails 25 is mounted between the upper ends of the pair of A pillars 19 and the upper ends of the pair of C pillars 24. Roof cross members 26 are provided between the pair of roof side rails 25, the Roof cross members 26 extending in a horizontal direction. The pair of roof side rails 25 are connected by the roof cross members 26. B pillars 27 are respectively provided between the middle portions of the side sills 21 and the middle portions of the roof side rails 25. The side sills 21 and the roof side rails 25 are connected by the respective B pillars 27. A pair of rear doors (not illustrated) is mounted on a pair of the respective B pillars 27. A rear door beam and a rear cross member are provided in each rear door. The rear end of each of the pair of side sills 21 is connected with the front end of corresponding one of a pair of rear side members 28. The pair of rear side members 28 project rearwardly from the rear bulk head 23, and a rear bumper beam 29 is mounted on the rear end of the pair of rear side members 28. Steel plates are welded to the above-described frame members. For example, a steel plate for reinforcement is mounted between each of the A pillars 19 and corresponding one of the front upper members 20. For example, a bonnet hood plate, right and left fender plates, a trunk lid plate, and a roof plate are mounted on the vehicle body 1 as outer plates. In this manner, the vehicle body 1 is completed. It is to be noted that the plurality of frame members can be connected by welding or a screw clamp.

In the same manner as in the vehicle body 1 in the chassis structure in which the frame members are mounted on a chassis base, drive sources such as an engine and a motor are mounted on the vehicle body 1 in the monocoque structure. A pair of right and left front wheels is mounted on the front part of the vehicle body 1 by a front suspension cross member and a pair of front suspensions which are not illustrated. A pair of right and left rear wheels is mounted on the rear part of the vehicle body 1 by a rear suspension cross member and a pair of rear suspensions which are not illustrated. In a typical vehicle, the engine, the motor, and the front suspension cross member are mounted on the pair of front side members 16. The upper end of each of the pair of front suspensions is inserted and mounted into a through hole 30 in a steel plate provided on a sheet metal between a corresponding one of the pair of front side members 16 and a corresponding one of the pair of front upper members 20. The rear suspension cross member is mounted on the pair of rear side members 28. The upper end of each of the pair of rear suspensions is inserted and mounted into a corresponding through hole of the rear bulk head 23 which is mounted on the pair of rear side members 28. The vehicle body 1 is supported on the front wheels and the rear wheels via the pair of front suspensions and the pair of rear suspensions.

An external force according to a running state is applied to the vehicle body 1. The external force during running is applied to the vehicle body 1 via the mounting positions of the front suspensions, the mounting position of the front suspension cross member, the mounting positions of the rear suspensions, and the mounting position of the rear suspension cross member. The vehicle body 1 should be formed such that it is resistant to deformation due to such external force. At the same time, some performances such as collision safety, favorable running performance, comfortable ride performance are required for the vehicle body 1. For this reason, it is generally necessary to form the vehicle body 1 having high rigidity.

However, some performances required of the vehicle body 1, for example, collision safety and favorable running performance are not necessarily compatible with each other. For example, the front side members 16, which project forward from the dashboard 15, support the engine, in order to achieve favorable running performance, the front side members 16 should have high rigidity capable of reliably supporting the engine against a cornering force, so that the engine is not displaced during cornering. On the other hand, in order to achieve collision safety performance, the front side members 16 should have relatively high rigidity and be able to absorb the impact of a strong collision by buckling. The collision safety performance generally is given higher priority than the running performance. The running performance is sacrificed for the collision safety performance. For example, the thickness of a sheet metal which is used for the front side members 16 is limited for the sake of the collision safety performance. The length of the front side members 16 is determined according to the size of the vehicle body 1. Insufficient thickness of the sheet metal may cause the front side member on which the engine is mounted to be bent or distorted when the vehicle is cornering. Such limitation on the rigidity of a vehicle body is applied to not only the front side members 16. The rigidity of each member included in the vehicle body 1 may be limited in order to achieve the collision safety performance. As a result, the vehicle body 1 is likely to be distorted during running of the vehicle even if the vehicle body 1 adopts a structure in which the frame members are reinforced with a rigid element such as a sheet metal or a metal rod. Thus, the above structure does not necessarily achieve high running performance required of the vehicle body 1, for example, high operational responsiveness and steering stability required of sport utility vehicles. When a strong force is not applied to the vehicle body 1 when running at a low speed, the rigidity for achieving collision safety performance satisfies the rigidity of the vehicle body 1. On the other hand, a strong force is applied to the vehicle body 1 in a running state such as high speed cornering. In this case, the rigidity for achieving collision safety performance may be insufficient for the rigidity of the vehicle body 1. The vehicle body 1 may be distorted.

In order to compensate insufficient rigidity according to various running states described above, in the present example, the rigidity of the vehicle body 1 is reinforced with a wire 42. Specifically, by adjusting the tension of the wire 42 according to a running state, the rigidity of the vehicle body 1 can be adaptively changed according to the running state. By changing the rigidity of the vehicle body 1 according to a running state during running of the vehicle, high collision safety performance of the vehicle body 1 is maintained and rigidity of the vehicle body 1 necessary for the running state can be obtained. Thus, the vehicle body 1 is not likely to be distorted during running of the vehicle. On the other hand, if the vehicle body 1 is reinforced with a rigid element such as a sheet metal or a metal rod and has a single level of rigidity, it is difficult to achieve high running performance and comfortable ride performance suitable for a sports running mode unless a higher priority is placed on favorable running performance and comfortable ride performance rather than the collision safety performance.

Figure 3:
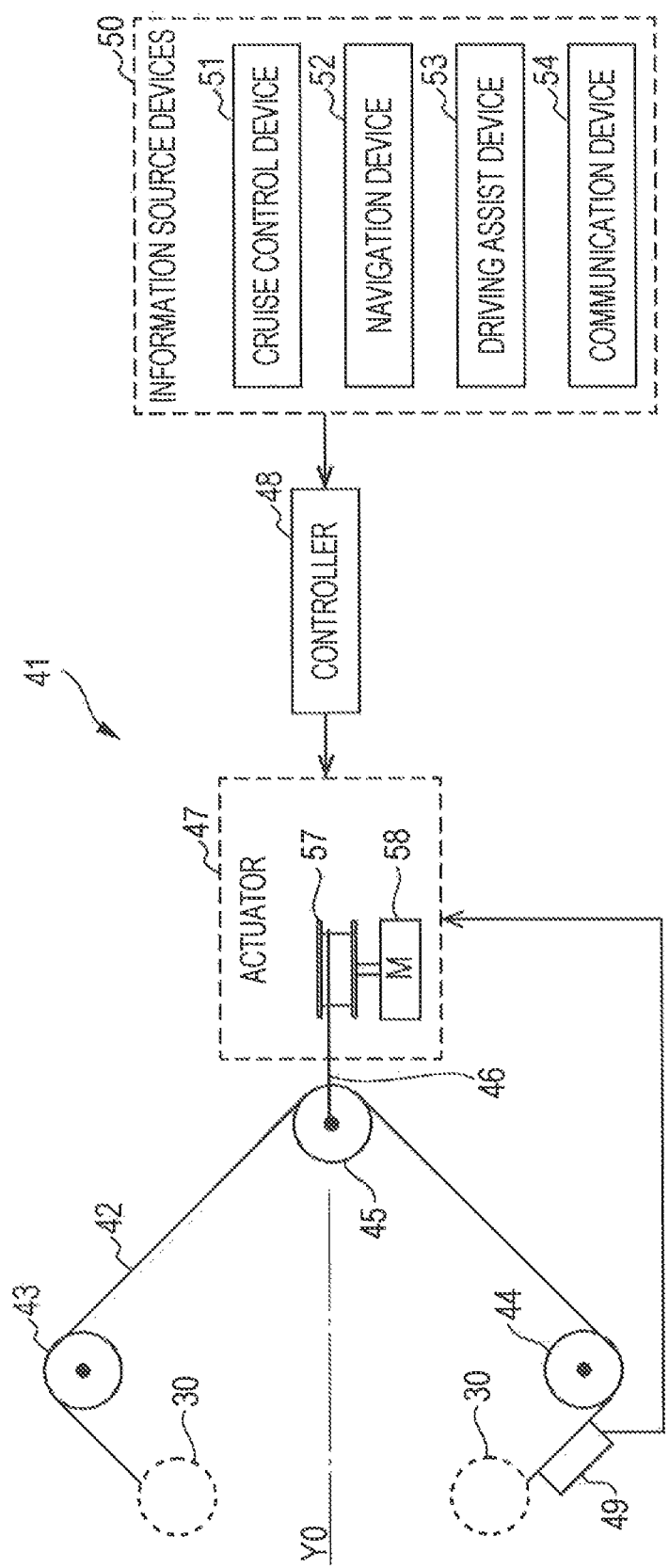
FIG. 3 is a block diagram illustrating a rigidity control device of the vehicle body.

FIG. 3 is a block diagram illustrating a rigidity control device 41 for the vehicle body 1 of FIG. 1 mounted therein. The rigidity control device 41 of the vehicle body 1 shown in FIG. 3 includes the wire 42 connected with the vehicle body 1; a first guide pulley 43; a second guide pulley 44; a movable pulley 45; an auxiliary wire 46; an actuator 47; a controller 48 that outputs, to the actuator 47, a control signal for adjusting tension according to a running state; and a tension detector 49 which detects the actual tension of the wire 42. In order to obtain information for determining a running state, the controller 48 is connected to information source devices 50 mounted in the vehicle, such as a cruise control device 51, a navigation device 52, a driving assist device 53, and a communication device 54.

The wire 42 is connected with the vehicle body 1 to apply tension to the vehicle body 1 when running. The collision safety performance of the vehicle body 1 is assured principally by the frame members and frame structure of the vehicle body 1. Thus, the wire 42 only has to be capable of withstanding the tension to be applied to the vehicle body 1. For instance, the wire 42 may be made of a metal line that is formed by twisting piano wires. Unlike a sheet metal or a metal rod which is used to reinforce the vehicle body 1, the wire 42 has flexibility. The tension of the wire 42 is generated by a force applied in a pulling direction in which the space between its both ends extends. However, tension of the wire 42 is not generated by a force applied in a retracting direction in which the space between its both ends reduces. The wire 42 is mounted such that it is loosen when buckling of the vehicle body 1 is occurs, thus deformation of the vehicle body 1 is not likely to be prevented. The wire 42 basically does not reduce collision safety performance of the vehicle body 1. The both ends of the wire 42 of FIG. 3 are mounted on the vehicle body 1. For example, they are mounted at positions where a pair of front suspensions formed on the right and left sides of the vehicle body 1 is mounted. In the vehicle body 1 of FIGS. 1 and 2, a pair of through holes 30 corresponds to the mounting positions of the pair of front suspensions. The mounting positions of the pair of front suspensions are each a receiving portion via which the vehicle body 1 receives an external force, and may be deformed by receiving an external force according to a behavior of the front suspensions. The end of the wire 42 may be directly mounted on the vehicle body 1 by a screw clamp, welding or other methods.

Figure 4:
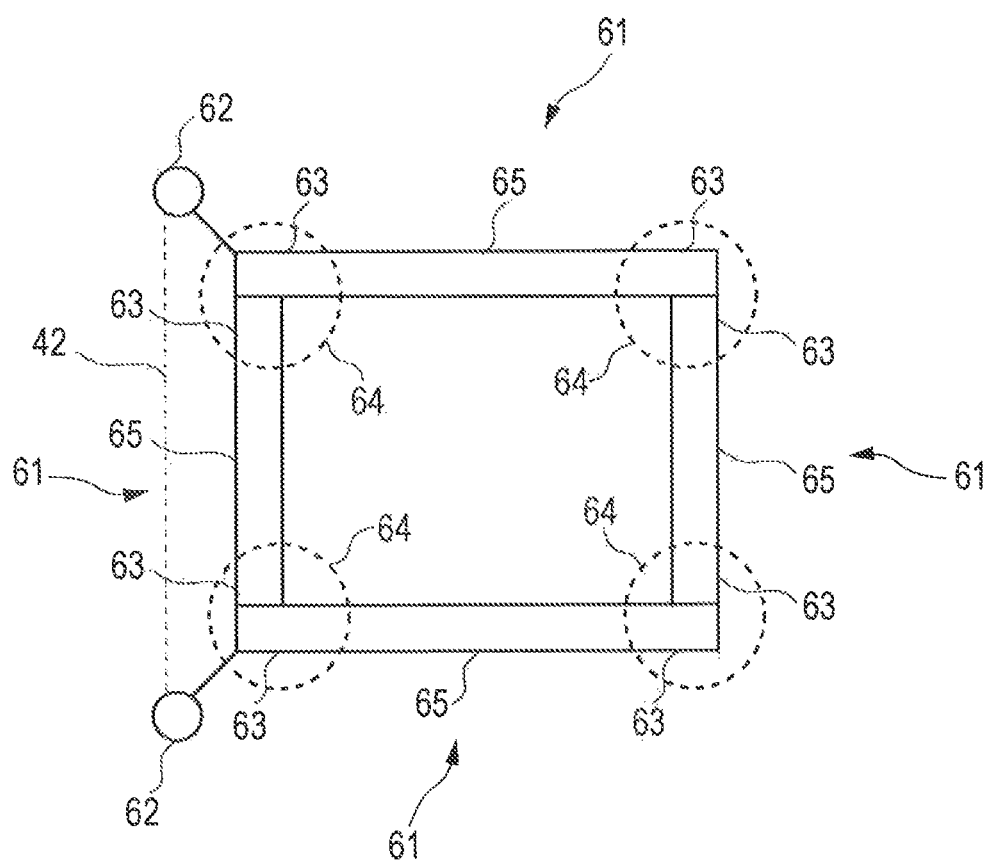
FIG. 4 is a diagram illustrating frame members of the vehicle body and receiving portions via which the vehicle body receives an external force.

A method of mounting the wire 42 on the vehicle body 1 is not limited to the one illustrated in FIG. 3. For example, one end of the wire 42 may be mounted on the vehicle body 1, and the other end may be mounted on the actuator 47. FIG. 4 is a diagram schematically illustrating the frame members of the vehicle body 1 and the receiving portions for an external force to the vehicle body 1. In FIG. 4, four frame members 61 are assembled in a rectangular frame shape. Receiving portions 62 for an external force re provided outside of the frame. The receiving portions 62 for an external force are, for example, the mounting positions of a front suspension and are located in the steel plate which is mounted on one of the frame members 61. The wire 42 in FIG. 3 is suspended between a pair of the receiving portions 62 for an external force of FIG. 4. In addition, the wire 42 may be connected with, for example, the receiving portions 62 for an external force, ends 63 of the frame members 61, connecting portions 64 between the frame members 61, and middle portions 65 of the frame members 61. The wire 42 may be suspended, for example, between the ends 63 of the pair of frame members 61.

Specific mounting positions of the wire 42 may be other than the mounting positions of the pair of front suspensions. The wire 42 may be mounted so as to be suspended, for example, between the A pillars 19 and the front upper members 20 which are connected with each other in FIG. 1. The space between the A pillars 19 and the front upper members 20 is not likely to be extended due to a force received via the mounting position of a front suspension. The wire 42 may be mounted so as to be suspended between the front side members 16 and the steel plates 22 in a torque box structure, the front side members 16 being connected with each other in FIG. 2. Thus, the front side members 16 are not likely to be inclined in the right or left direction during cornering. The wire 42 may be mounted so as to be suspended between the both right and left edges of the center tunnel 12 which has a cross section in an upside down U shape in FIG. 2. In this case, a pair of wires may cross each other. In this manner, the space between the both right and left edges of the center tunnel 12 is not likely to be extended. In addition, the wire 42 may be mounted so as to be suspended between the middle portions of the pair of rear side members 28. The space between the pair of rear side members 28 is not likely to be extended due to a load at the time of acceleration.

The first guide pulley 43 and the second guide pulley 44 are mounted in the vicinity of the mounting positions of both ends of the wire 42 at the right and left sides of the vehicle body 1. For example, the first guide pulley 43 and the second guide pulley 44 are provided near the respective through holes 30 which are mounted on the front suspensions. The pair of these guide pulleys regulates the direction of the tension of the wire 42 which is applied to the mounting positions of the wire 42. In FIG. 3, a pair of guide pulleys are mounted on the right and left sides of the vehicle body 1. Thus, the wire 42 suspended between the pair of guide pulleys is mounted on the mounting positions of the front suspensions from the outside of the mounting positions. In this case, the mounting positions of the front suspensions are pulled outwardly by the tension of the wire 42. The mounting positions of the front suspensions may be displaced so as to be inclined inwardly by receiving an external force. This displacement can be prevented. A rib, a tube and others, across which the wire 42 can be suspended, may be used instead of the guide pulleys. It may be unnecessary to use the guide pulleys depending on the disposition relationship between the actuator 47 and the mounting positions of the wire 42 to the vehicle body 1.

The actuator 47 provides tension directly or indirectly to the wire 42. The actuator 47 adjusts the tension of the wire 42 during running of the vehicle. Accordingly, the rigidity and rigidity balance of the vehicle body 1 change while the vehicle is running. The actuator 47 may be an electric motor 58 on which, for example, a reel 57 for winding the wire 42 is mounted. The wire 42 is wound onto the reel 57 by the driving force of the electric motor 58. The tension according to the driving force of the electric motor 58 is applied to the wire 42 and its mounting positions. An oil motor or an engine which burns fuel may be used instead of the electric motor 58. In addition to the electric motor 58, the oil motor, and the engine, a ratchet mechanism, which maintains a winding state of the wire 42 at a constant state, may be used. By adjusting the tension of the wire 42 using the actuator 47, tension according to a running state can be applied to the vehicle body 1 during running of the vehicle. On the contrary, when the wire 42 is fixed to the vehicle body 1 with predetermined tension, the tension applied to the vehicle body 1 via the wire 42 is constant. Thus, appropriate tension according to a running state cannot be applied to the vehicle body 1 during running of the vehicle. Originally, the vehicle body 1 is formed such that predetermined rigidity is obtained. When the tension of the wire 42 does not suitable for an external force, the vehicle body 1 may experience deformation which is different from designed deformation of the vehicle body 1. The operability and comfortable ride performance may significantly change even when the rigidity or rigidity balance of the vehicle body 1 is slightly off. By adopting a configuration in which the tension of the wire 42 can be adjusted according to a running state during running of the vehicle, the rigidity of the vehicle body 1 can be changed, and thus favorable operativity and ride performance can be obtained. In FIG. 3, the actuator 47 is connected to the movable pulley 45 via the auxiliary wire 4G. The movable pulley 45 is attached to the wire 42. The actuator 47 directly drives the movable pulley 45 and indirectly provides tension to the wire 42 which applies tension to the vehicle body 1. The actuator 47 is disposed on the center line (line Y0) of the vehicle body 1. The actuator 47 can cause the same tension to be applied to the both ends of the wire 42. A connection configuration between the actuator 47 and the wire 42 for causing tension to be applied to the vehicle body 1 is not limited to the configuration of FIG. 3. The actuator 47 may be directly connected with one end of the wire 42. In this case, it is necessary to mount the actuator 47 to the vehicle body 1 with strength capable of withstanding the tension of the wire 42.

The tension detector 49 directly or indirectly detects the tension which is applied to the vehicle body 1 via the wire 42. The tension detector 49 may be, for example, a strain gauge. The strain gauge can be attached to the surface of the wire 42. The strain gauge is deformed according to the expansion and contraction of the wire 42 and detects the tension of the wire 42 through a change in resistance value due to the deformation. One end of the wire 42 may be mounted on the vehicle body 1 via the tension detector 49. In this case, it is necessary to mount the tension detector 49 to the vehicle body 1 with strength capable of withstanding the tension of the wire 42. The tension detector 49 outputs a detection signal to the actuator 47, the detection signal indicating the tension to be applied to the vehicle body 1 via the wire 42. The actuator 47 adjusts the tension applied to the wire 42, so that actual tension of the wire 42 detected by the tension detector 49 converges to a target tension designated by the controller 48. In FIG. 3, the tension detector 49 is mounted on the wire 42 which causes tension to be applied to the vehicle body 1, and detects the tension of the wire 42 directly. The tension detector 49 may indirectly detect the tension of the wire 42. For example, the auxiliary wire 46 for connecting the movable pulley 45 and the actuator 47 may be mounted.

The controller 48 outputs a control signal to the actuator 47 for adjusting the tension according to a running state. The controller 48 may be, for example, an engine control unit (ECU) mounted in the vehicle or other microcomputer. A microcomputer has, for example, a central processing unit (CPU), a memory, an I/O port, and a system bus which connects these. The I/O port is connected to the actuator 47. The CPU reads and executes programs stored in the memory. In this manner, the controller 48 is implemented. The controller 48 repeatedly determines a running state while the vehicle is running. The running state while the vehicle is running includes, for example, acceleration, deceleration, stop, right turning, left turning, and a speed range. The controller 48 identifies the tension of the wire 42 corresponding to a determined running state, generates a control signal, and outputs the generated control signal to the actuator 47 from the I/O port.

Figure 5:
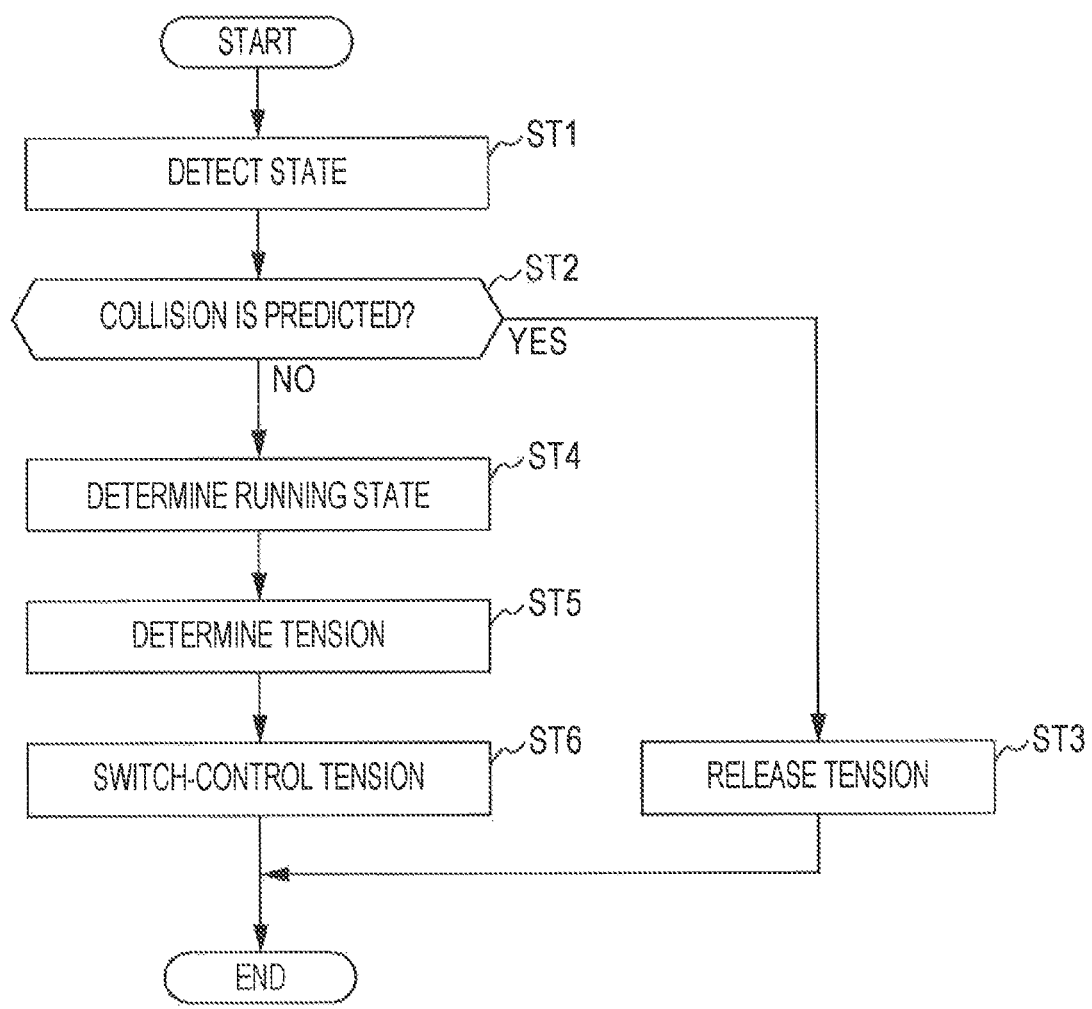
FIG. 5 is a flow chart of rigidity control of the vehicle body performed by the rigidity control device of FIG. 3.

FIG. 5 is a flow chart for controlling the rigidity of the vehicle body 1 according to a running state by the rigidity control device 41 of FIG. 3. The controller 48 repeats and performs the control of FIG. 5 while the vehicle is running. The controller 48 performs the rigidity control of FIG. 5 at an input timing of acceleration, braking, and steering operation by a driver.

In the rigidity control of the vehicle body 1 according to a running state, the controller 48 first obtains information (parameters used for control) for determining an external force applied to the vehicle body 1 according to the running state of the vehicle (step ST1). The controller 48 obtains information, for example from the cruise control device 51 of the vehicle. When skid of the front wheels or the rear wheels is detected by vehicle dynamics control (VDC), the cruise control device 51 controls braking of the wheels and the output of the engine, and stabilizes the running of the vehicle. The cruise control device 51 adjusts the damping force of a damper according to a running state, the damper being included in a magnetic ride suspension which is used in the front suspensions or the rear suspensions. The cruise control device 51 detects an opening degree of an accelerator, an amount of braking operation, and a rudder angle of steering performed by a driver. The controller 48 obtains these pieces of detection information, operation information, and control information as vehicle behavior data from the cruise control device 51. The controller 48 obtains information, for example, from the navigation device 52. The navigation device 52 searches and guides a route from the current location according to destination setting. For the search of a route, link data indicating the roads included in map data, geographical feature data, and other data are used. The controller 48 obtains information of e.g., guide routes, geographical features, and roads as navigation information from the navigation device 52. In addition, the controller 48 obtains information, for example, from the driving assist device 53. The driving assist device 53 captures the surrounding area or the area ahead of the vehicle by a camera, predicts hazards such as collision based on captured images, and issues an alarm. When dangerous conditions continue after the alarm, danger avoidance control such as stopping the vehicle is performed. The controller 48 obtains from the driving assist device 53 captured images, information of dangerous objects, danger forecast information, for example, in the surrounding area or the area ahead of the vehicle. In addition, the controller 48 obtains e.g., traffic information from the communication device 54. The communication device 54 receives traffic information, for example, at Intelligent Transport System (ITS), Vehicle Information and Communication System (VICS). The traffic information includes traffic congestion information on the road along which the vehicle is guided. The controller 48 obtains, for example, traffic information from the communication device 54.

After obtaining the information for determining a running state, the controller 48 determines possibility of a collision before determining a running state and an external force based on the obtained information (step ST2). The controller 48 determines presence of a dangerous object which is highly likely to cause a collision, for example, based on the captured images ahead of the vehicle or the danger forecast information.

When it is determined that there is possibility of a collision, the controller 48 performs tension control for collision instead of normal tension control described below (step ST3). The controller 48 outputs a control signal upon collision prediction instead of a control signal according to a normal running state. The controller 48 outputs a control signal to the actuator 47, the control signal for releasing the tension of the wire 42, for example. When receiving a control signal for releasing the tension of the wire 42, the actuator 47 stops the driving of the motor, so that the tension of the wire 42 becomes 0. As a result, the tension of the wire 42 is released. Thus, by determining possibility of a collision and controlling to release the tension of the wire 42, the tension of the wire 42 can be prevented from applying to the vehicle body 1 before an actual collision with the vehicle occurs. Because a collision with the vehicle body 1 occurs with no tension of the wire 42 applied to the vehicle body 1, the collision occurs with the collision performance designed for the vehicle body 1. It is possible to eliminate the possibility of reduction of the collision safety performance of the vehicle body 1 due to the tension of the wire 42. The possibility of a collision can be determined and the tension of the wire 42 is released before actually controlling the rigidity of the vehicle body 1 and immediately after obtaining the information for determining a running state in the processing routine for controlling the rigidity of the vehicle body 1 according to a running state. Accordingly, the tension of the wire 42 can be released without causing the tension to be changed. On the contrary, for example if a collision is determined and the tension is released under the control without executing the processing routine for controlling the rigidity, depending on the timing of releasing the tension of the wire 42, the tension of the wire 42 may be first changed by the processing routine for controlling the rigidity, and subsequently, the tension of the wire 42 may be released. The tension of the wire 42 may be changed during a period for avoiding a collision, and an unnecessary behavior of the vehicle body 1 may occur immediately before the collision.

On the other hand, when it is determined that there is no possibility of collision, the controller 48 continues the normal tension control. The controller 48 determines a running state of the vehicle body 1 and an external force applied to the vehicle based on the obtained information (step ST4). The controller 48 obtains tension for controlling the distortion of the vehicle body 1 based on the determined external force (step ST5). The controller 48 outputs a control signal to the actuator 47, the control signal designating the obtained tension (step ST6). When the control signal is updated, the actuator 47 adjusts the tension of the wire 42, so that detected tension of the wire 42 matches newly designated target tension. The actuator 47 pulls the auxiliary wire 46 so as to urge the movable pulley 45 against the wire 42 and provides tension to the wire 42. Consequently, tension is applied between the pair of mounting positions on which the both ends of the wire 42 are mounted, so that the space between the mounting positions is not reduced. A tension according to a running state is applied to the vehicle body 1 during running of the vehicle. The rigidity of the vehicle body 1 changes according to a running state while the vehicle is running. The rigidity of the vehicle body 1 can change so as to reduce distortion of the vehicle body 1 due to an external force which is applied to the vehicle body 1 according to a running state.

Next, a specific example of the control in steps ST4 to ST6 will be described. The controller 48 obtains an operation state of vehicle dynamics control or damper control information of the magnetic ride suspension as behavior information of the vehicle body. In addition, the controller 48 obtains information of the opening degree of the accelerator, braking operation, and a steering angle as information of operation input to the vehicle body. Further, the controller 48 obtains captured images outside the vehicle, navigation information, or traffic information as forecast information of the travelling route.

The controller 48 determines a running state of the vehicle based on the obtained information. The running state includes, for example, an acceleration state, a deceleration state, a stop state, a turn state, and a speed range. The controller 48 determines which running state the vehicle is in. The controller 48 determines an acceleration state, a deceleration state, a stop state, a turn state, or a speed range based on the obtained operation state of vehicle dynamics control, damper control information of the magnetic ride suspension, information of the opening degree of the accelerator, brake operation information, or steering angle information.

In addition, the controller 48 determines a state of the travelling road based on the obtained captured images outside the vehicle, navigation information, or traffic information. Finally, the controller 48 calculates and obtains tension corresponding to an external force which is applied to the vehicle body 1, based on the determined running state of the vehicle body itself and the determined state of the travelling road. In this manner, the controller 48 determines a final running state by considering not only the running state of the vehicle body itself, but also the state of the traveling road. Thus, the final running state varies according to the state of the traveling road.

When the determined running state has changed from the previous state, the controller 48 updates the control signal. Consequently, the tension of the wire 42 is changed. When the determined running state is the same as the previous state, the controller 48 does not update the control signal. The controller 48 continues to output the previous control signal. The tension of the wire 42 is maintained at the same tension as in the previous state.

As described above, in the present example, while the vehicle is running, the actuator 47 adjusts the tension of the wire 42 according to a running state based on a control signal from the controller 48. The tension of the wire 42 corresponding to the running state will be applied to the vehicle body 1 which is not likely to be distorted during running of the vehicle. Consequently, even when something happens to cause distortion of the vehicle body 1 during running of the vehicle, insufficient rigidity of the vehicle body 1 is adaptively compensated by the tension of the wire 42, and thus the vehicle body 1 is not likely to be distorted. The rigidity of the vehicle body 1 can be changed so as to prevent distortion of the vehicle body 1 during running of the vehicle. It is possible to achieve high running performance, for example, high operational responsiveness and steering stability demanded of sport utility vehicles, the high running performance being not available if the vehicle body 1 has constant rigidity. In particular, in the present example, the controller 48 determines a running state while the vehicle is running based on a behavior of the vehicle body 1, an operation input to the vehicle body 1, or forecast information of the travelling route. The tension of the wire 42 to be applied to the vehicle body 1 is then adjusted to a tension corresponding to the rigidity needed in the determined state of running. Even when a force applied to the vehicle body 1 changes every moment while the vehicle is running, the rigidity of the vehicle body 1 can be adaptively changed accordingly. Appropriate operational responsiveness and steering stability according to a running state are obtained.

In the present example, the controller 48 determines acceleration, deceleration, stop, turning, or a speed range of the vehicle body 1 as a running state of the vehicle, and when the determined running state changes, the control signal is updated. The tension of the wire 42 is changed at a timing when the running state changes. On the contrary, for example if the tension of the wire 42 is changed at any timing independent of the running state, the tension may be adjusted, for example, while a strong external force is applied to the vehicle body 1. In this case, the rigidity or rigidity balance of the vehicle body 1 may change while a strong external force is applied thereto, and an unnecessary behavior of the vehicle body 1 may occur. As a result, a driver may have an uncomfortable feeling. Such uncomfortable feeling can be reduced by changing the tension of the wire 42 as in the present example at a timing when a running state changes. Furthermore, in the present example, the tension detector 49 detects the tension of the wire 42, and the actuator 47 adjusts the tension of the wire 42, so that the detected tension of the wire 42 matches a target tension designated by a control signal. The tension of the wire 42 is maintained at an substantially constant level in a period since a control signal is updated until the control signal is subsequently updated. The tension of the wire 42 can be maintained at an substantially constant level irrespective of whether or not distortion of the vehicle body 1 has occurred. By maintaining the tension at a constant level even in a state where distortion of the vehicle body 1 occurs, the rigidity or rigid balance of the vehicle body 1 is not likely to be changed before and after the occurrence of distortion.

An external force applied to the vehicle body 1 practically changes according to not only the acceleration state, deceleration state, stop state, turn state, or speed range of the vehicle, but also presence of traffic congestion on the travelling route, whether the travelling road is an unpaved road or a paved road, for example. In contrast to the case where only a running state of the vehicle itself is determined, the present example takes the conditions of the travelling road into consideration in determining a running state, whereby an appropriate tension corresponding to the external force actually applied to the vehicle body 1 can be applied to the vehicle body 1. For example, when the vehicle is accelerated on a highway or when the vehicle runs on a winding road, a strong external force is practically applied to the vehicle body 1. Even in such a running state, an external force applied to the vehicle body 1 is expected to be relatively small when the travelling road is congested or unpaved. The controller 48 determines an external force applied to the vehicle body 1 according to the road conditions in an adjustable manner, thus a tension corresponding to the external force actually applied to the vehicle body 1 can be applied to the vehicle body 1.

In the present example, when a collision is predicted, the tension of the wire is released. When the tension of the wire is released, the tension of the wire can be prevented from being applied to the vehicle body when a collision occurs. As a result, a collision with the vehicle body occurs with the collision performance designed for the vehicle body.

Second Example

Figure 6:
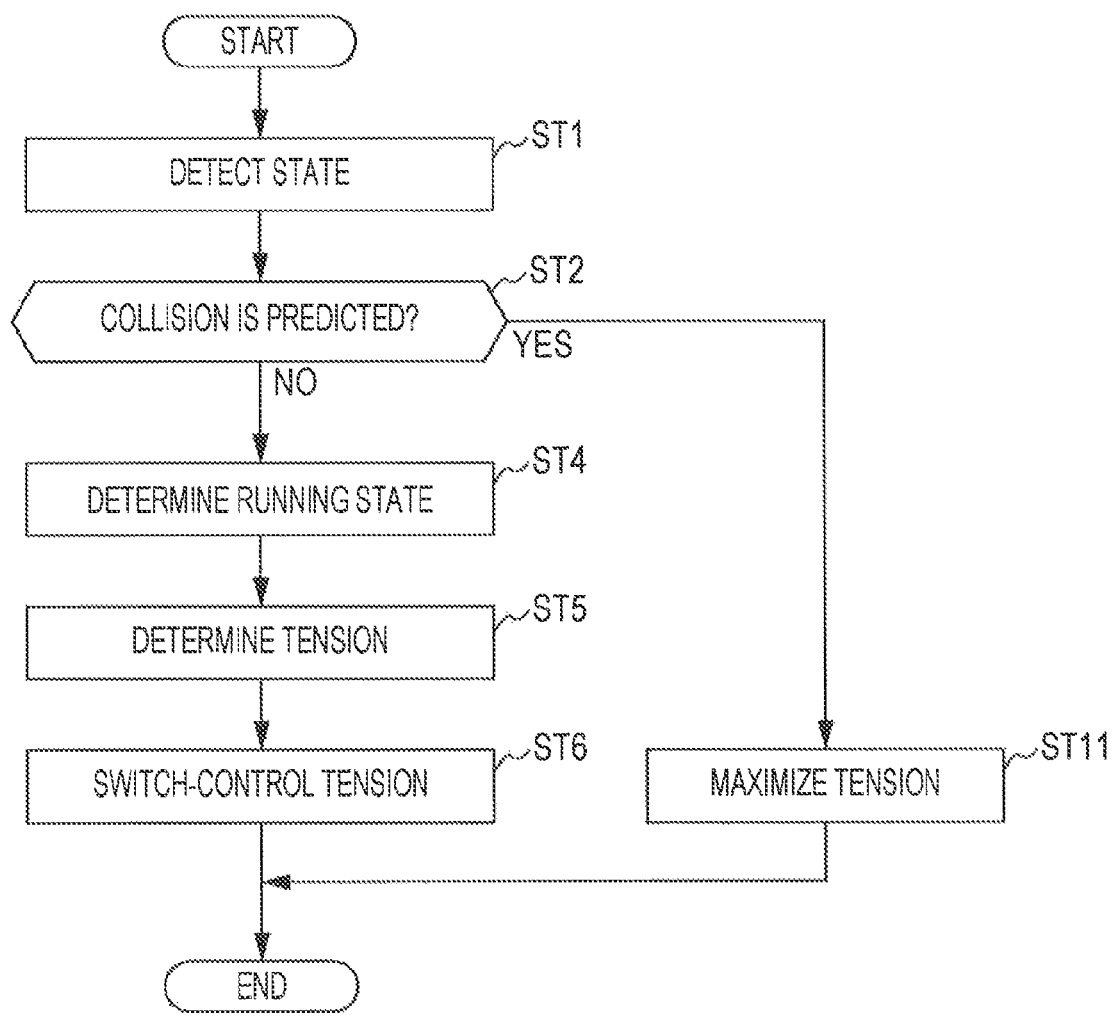
FIG. 6 is a flow chart for rigidity control of the vehicle body performed by a rigidity control device according to a second example of the present invention.

FIG. 6 is a flow chart for rigidity control of the vehicle body 1 performed by the rigidity control device 41 according to a second example of the present invention. The configuration of the vehicle body 1 and the rigidity control device 41 in the second example are the same as those of the first example, thus the same reference symbols are provided and a description thereof is omitted. The controller 48 repeatedly performs the control of FIG. 6 while the vehicle is running. The controller 48 performs the rigidity control of FIG. 6 at an input timing of acceleration, braking, and steering operation by a driver.

After obtaining the information (parameters used for control) for determining an external force applied to the vehicle body 1 according to a running state of the vehicle in step ST1, the controller 48 determines possibility of a collision (step ST2). When it is determined that there is a possibility of a collision, the controller 48 performs tension control for a collision instead of the below-described normal tension control (step ST11). The controller 48 outputs a control signal to the actuator 47 for controlling the tension of the wire 42 at a maximum. The actuator 47 drives the motor with a maximum output so as to maximize the tension of the wire 42. As a result, the tension of the wire 42 reaches a maximum. In this manner, possibility of a collision is determined and the tension of the wire 42 is controlled at a maximum, thus the vehicle body 1 can be reinforced with the tension of the wire 42 before a collision of the vehicle actually occurs. A collision of the vehicle body 1 occurs with a maximum tension of the wire 42 applied thereto, thus the collision occurs with the collision performance which is not achieved by the vehicle body only. That is, the collision safety performance of the vehicle body 1 is improved because of the tension of the wire 42. The processing in the case where there is no possibility of a collision is the same as the processing of FIG. 5, and a description is omitted.

As described above, in this example, when a collision is predicted, the tension of the wire 42 is set at a maximum. When the tension of the wire 42 is set at a maximum, the tension of the wire 42 can be applied to the vehicle body 1 even at the time of a collision. Accordingly, the collision of the vehicle body 1 may occur in a state where the vehicle body 1 is reinforced with the tension of the wire 42. According to the examples the vehicle body 1 is not likely to be distorted during running of the vehicle. Consequently, even when something happens to cause distortion of the vehicle body 1 during running of the vehicle, insufficient rigidity of the vehicle body is adaptively compensated by the tension of the wire 42, and thus the vehicle body 1 is not likely to be distorted. The rigidity of the vehicle body 1 can be changed so as to prevent distortion of the vehicle body 1 during running of the vehicle. It is possible to achieve high running performance, for example, high operational responsiveness and steering stability required for sport utility vehicles, the high running performance being not available if the vehicle body 1 has constant rigidity.

The present invention is not limited to the above examples. Various modifications and changes may be made in a range without departing from the spirit of the invention.

Figure 7:
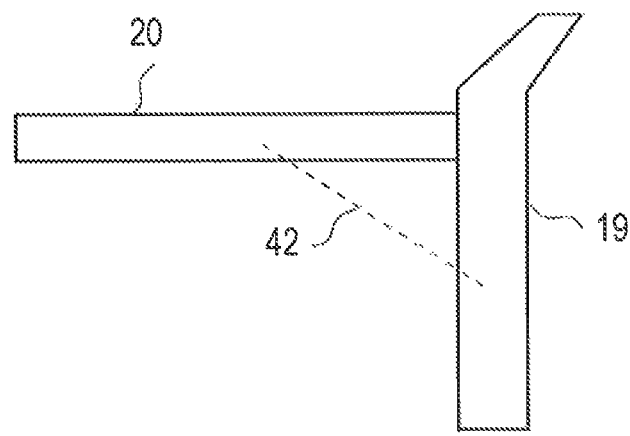
FIG. 7 is a diagram schematically illustrating a modification of the mounting position of a wire.
Figure 8:
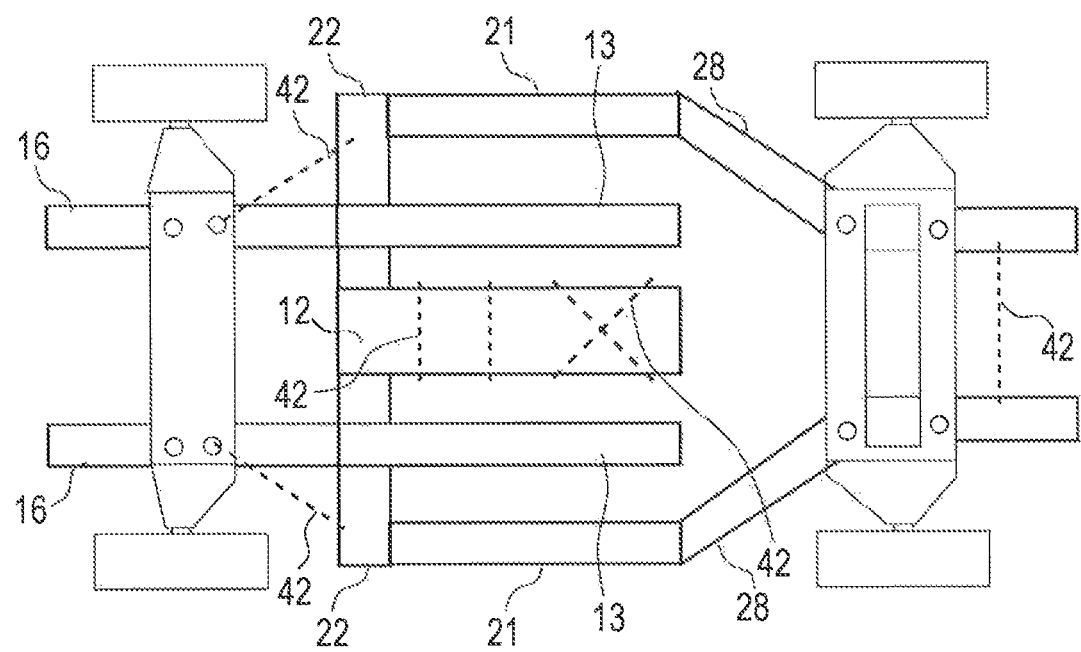
FIG. 8 is a diagram schematically illustrating another modification of the mounting position of the wire.

In the above examples, the wire 42 is suspended between the pair of through holes 30 on which the front suspensions are mounted. Alternatively, for example, as illustrated in FIG. 7, the wire 42 may be suspended between the A pillars 19 and the front upper members 20. Further, as illustrated in FIG. 8, the wire 42 may be suspended between the pair of front side members 16. The wire 42 may be suspended between the front suspension cross member and the steel plate 22 in a torque box structure. The wire 42 may be suspended between a pair of edges of the center tunnel 12. The wire 42 may be suspended between the pair of rear side members 28.

In the above examples, the present invention is applied to the vehicle body 1 of an automobile. The present invention may be applied to, for instance, a bus, an vehicle such as a garbage truck, a train, a motorcycle, or a bicycle. An external force according to a running state is applied to the vehicle body of each of those. The present invention may be applied to a vehicle body having a chassis structure. In the vehicle body to which the present invention is applied, the frame members may be integrated with the sheet metals of the vehicle body and the chassis base. The vehicle body may be reinforced with a rigid element such as a sheet metal.

The invention claimed is:

1. A vehicle comprising:
a vehicle body comprising a number of body members;
a wire mounted to at least one of said body members to which an external force is applied according to a running state of the vehicle during running of the vehicle, the wire being mounted in a manner for applying a tension to the vehicle body;
an actuator communicating with the wire for adjusting a tension of the wire to change the rigidity of the vehicle body; and
a controller to output a control signal to the actuator for adjusting the tension of the wire,
wherein the controller determines the running state of the vehicle, identifies a target tension for the wire according to the determined running state, and outputs to the actuator a control signal designating the target tension for the wire to control distortion of the vehicle body according to the determined running state.

2. The vehicle according to claim 1, wherein
the controller is configured to obtain at least one of: behavior information of the vehicle body, information of operation input to the vehicle body, and forecast information of a travelling route; and
the controller is further configured to determine the running state of the vehicle based on the obtained information.

3. The vehicle according to claim 2, wherein the controller is configured:
to obtain an operation state of vehicle dynamics control or damper control information of a magnetic ride suspension as the behavior information of the vehicle body;
to obtain information of an opening degree of an accelerator, a braking operation, or a steering angle as the information of operation input to the vehicle body; or
to obtain a captured image outside the vehicle, navigation information, or traffic information as the forecast information of the travelling route.

4. The vehicle according to claim 1, wherein the controller is configured:
to repeatedly determine any one of an acceleration state, a deceleration state, a stop state, a turn state, and a speed range as the running state of the vehicle; and
to update the control signal and change the tension of the wire when it is determined the running state of the vehicle has changed.

5. The vehicle according to claim 2, wherein the controller is configured:
to repeatedly determine any one of an acceleration state, a deceleration state, a stop state, a turn state, and a speed range as the running state during running of the vehicle; and
to update the control signal and change the tension of the wire when it is determined the running state of the vehicle has changed.

6. The vehicle according to claim 3, wherein the controller is configured:
to repeatedly determine any one of an acceleration state, a deceleration state, a stop state, a turn state, and a speed range as the running state of the vehicle; and
to update the control signal and change the tension of the wire when it is determined the running state of the vehicle has changed.

7. The vehicle according to claim 4, further comprising a detector to detect the tension of the wire, wherein the actuator is configured to adjust the tension of the wire detected by the detector to match a target tension designated by the control signal of the controller.

8. The vehicle according to claim 5, further comprising a detector to detect the tension of the wire, wherein the actuator is configured to adjust the tension of the wire detected by the detector to match a target tension designated by the control signal of the controller.

9. The vehicle according to claim 6, further comprising a detector to detect the tension of the wire, wherein the actuator is configured to adjust the tension of the wire detected by the detector to match a target tension designated by the control signal of the controller.

10. The vehicle according to claim 1, wherein
the controller is configured to:
determine the running state of the vehicle as being an acceleration state, a deceleration state, a stop state, a turn state, or a speed range;
determine the running state of the vehicle based on an operation state of vehicle dynamics control, damper control information of a magnetic ride suspension, information of an opening degree of an accelerator, brake operation information, or steering angle information;
determine a state of a travelling road based on a captured image outside the vehicle, navigation information, or traffic information; and
determine an adjusted running state of the vehicle based on the determined state of the travelling road.

11. The vehicle according to claim 2, wherein
the controller is configured to:

determine the running state of the vehicle as being an acceleration state, a deceleration state, a stop state, a turn state, or a speed range;

determine the running state of the vehicle based on the behavior information of the vehicle body or the information of operation input to the vehicle body;

determine a state of the travelling road based on the forecast information of a travelling route; and determine an adjusted running state of the vehicle based on the determined running state of the vehicle and the determined state of the travelling road, the controller is further configured:

if determining the running state of the vehicle based on the behavior information of the vehicle, to use an operation state of vehicle dynamics control or damper control information of a magnetic ride suspension as behavior information of the vehicle, if determining the running state of the vehicle based on the information of operation input to the vehicle body, to use information of an opening degree of an accelerator, brake operation information, or steering angle information as information of operation input to the vehicle body, and to use a captured image outside the vehicle, navigation information, or traffic information as forecast information of a travelling route.

12. The vehicle according to claim 3, wherein the controller is configured to:

determine the running state of the vehicle as being an acceleration state, a deceleration state, a stop state, a turn state, or a speed range;

determine the running state of the vehicle based on the behavior information of the vehicle body or the information of operation input to the vehicle body; and determine an adjusted running state of the vehicle based on the determined running state of the vehicle and the determined state of the travelling road.

13. The vehicle according to claim 2, wherein the controller is configured to predict the presence of a collision based on the obtained information, and to control the tension of the wire to be released or at a maximum when a collision is predicted.

14. The vehicle according to claim 3, wherein the controller is configured to predict the presence of a collision based on the obtained information, and to control the tension of the wire to be released or at a maximum when a collision is predicted.

15. The vehicle according to claim 1, wherein
a movable pulley is attached to the wire; and
the actuator is configured to apply a tension to the wire by moving the movable pulley in a direction in which the movable pulley is pressed against the wire.

16. The vehicle according to claim 1, wherein the controller is configured to predict the presence of a collision, and to control the tension of the wire to be released or at a maximum when a collision is predicted.

* * * * *